US009366045B2

(12) United States Patent  
Coenraets

(10) Patent No.: US 9,366,045 B2
(45) Date of Patent: Jun. 14, 2016

(54) DEVICE FOR COVERING A SURFACE, COMPRISING ATTACHMENT ROLLS ALONG THE EDGES OF THE COVER

(71) Applicant: BECOFLEX S.A., Wauthier-braine (BE)

(72) Inventor: Benoit Coenraets, Wauthier-braine (BE)

(73) Assignee: Becoflex S.A., Wauthier-Braine (BE)

( * ) Notice: Subject to any disclaimer, the term of this patent is extended or adjusted under 35 U.S.C. 154(b) by 0 days.

(21) Appl. No.: 14/437,895

(22) PCT Filed: Oct. 23, 2013

(86) PCT No.: PCT/EP2013/072139
§ 371 (c)(1),
(2) Date: Apr. 23, 2015

(87) PCT Pub. No.: WO2014/064138
PCT Pub. Date: May 1, 2014

(65) Prior Publication Data
US 2015/0284969 A1 Oct. 8, 2015

(30) Foreign Application Priority Data

Oct. 24, 2012 (BE) .................................. 2012/0725

(51) Int. Cl.
*E04H 4/10* (2006.01)
*A01G 9/22* (2006.01)
(Continued)

(52) U.S. Cl.
CPC ................ *E04H 4/101* (2013.01); *A01G 9/227* (2013.01); *A63C 19/12* (2013.01); *B60J 7/085* (2013.01); *B61D 39/00* (2013.01); *Y02T 30/30* (2013.01)

(58) Field of Classification Search
CPC ............................... A63C 19/12; E04H 4/101
USPC ............. 160/273.1; 296/98; 4/498, 502, 503; 473/504
See application file for complete search history.

(56) References Cited

U.S. PATENT DOCUMENTS 3,574,979 A  4/1971 Chan
4,001,900 A  1/1977 Lamb
(Continued)

FOREIGN PATENT DOCUMENTS

CA  2115113 A1  8/1995
DE  2257231 A1  5/1974
(Continued)

OTHER PUBLICATIONS

International Search Report for Application No. PCT/EP2013/072139 dated Feb. 19, 2014.
(Continued)

*Primary Examiner* — Paul R Durand
*Assistant Examiner* — Nicholas Ros
(74) *Attorney, Agent, or Firm* — Norris McLaughlin & Marcus P.A.

(57) ABSTRACT

The invention relates to a device (1) for covering a surface (3), comprising: (a) a cover (10), each longitudinal edge of which is provided with a roll (12) formed by a core (12c) contained in a tubular sheath (12t) provided with a strip (12b) along the length thereof, said strip being attached to at least one surface of the cover; (b) a rotatably mounted drum (2) that can wind or unwind the cover (10), said drum (2) being mounted on a longitudinal translation mechanism comprising rails (6) arranged either side of said surface (3); and (c) a system for continuously locking the roll (12) of the longitudinal edges of the cover (10) in the rails (5), and unlocking said roll from same, during the translation of the drum, characterized in that the core (12c) of the roll is attached to the tubular sheath (12t) in such a way as to prevent it from sliding along the sheath.

13 Claims, 3 Drawing Sheets

(51) Int. Cl.
*A63C 19/12* (2006.01)
*B61D 39/00* (2006.01)
*B60J 7/08* (2006.01)

(56) References Cited

U.S. PATENT DOCUMENTS

| | | | |
|---|---|---|---|
| 4,195,370 A | 4/1980 | Budd | |
| 4,494,256 A * | 1/1985 | Radtke | E04H 4/101 160/265 |
| 4,792,178 A * | 12/1988 | Kokx | B60P 7/04 160/266 |
| 5,845,343 A * | 12/1998 | Last | E04H 4/101 160/273.1 |
| 5,920,922 A * | 7/1999 | Ragsdale | E04H 4/101 4/498 |
| 5,930,848 A | 8/1999 | Last | |
| 6,691,334 B2 | 2/2004 | St-Hilaire | |
| 6,991,700 B2 * | 1/2006 | Smith | E04H 4/101 156/308.4 |
| 2001/0023506 A1 | 9/2001 | Mathis et al. | |
| 2003/0097709 A1 | 5/2003 | Smith | |
| 2003/0173795 A1 | 9/2003 | Dumas | |
| 2005/0097834 A1 | 5/2005 | King et al. | |
| 2011/0119823 A1 | 5/2011 | Coenraets | |

FOREIGN PATENT DOCUMENTS

| | | | |
|---|---|---|---|
| EP | 1719858 | A2 | 11/2006 |
| FR | 900951 | A | 7/1945 |
| FR | 2652373 | A1 | 3/1991 |
| FR | 2743502 | A1 | 7/1997 |
| FR | 2789425 | A1 | 8/2000 |
| FR | 2803769 | A1 | 7/2001 |
| FR | 2893651 | A1 | 5/2007 |
| GB | 2199741 | A | 7/1988 |
| GB | 2379163 | A | 3/2003 |
| WO | 2005026473 | A1 | 3/2005 |
| WO | 2007036625 | A1 | 4/2007 |
| WO | 2010010152 | A1 | 1/2010 |
| WO | 2010054960 | A1 | 5/2010 |

OTHER PUBLICATIONS

International Preliminary Report on Patentability for Application No. PCT/EP2013/072139 dated Nov. 10, 2014.

* cited by examiner

DEVICE FOR COVERING A SURFACE, COMPRISING ATTACHMENT ROLLS ALONG THE EDGES OF THE COVER

This application is a 371 application of PCT/EP2013/072139 filed Oct. 23, 2013, which claims foreign priority benefit under 35 U.S.C. §119 of Belgium Application No. BE 201200725 filed Oct. 24, 2012.

FIELD OF THE INVENTION

The invention relates to a device for covering a surface, easy to implement and meeting as best as possible the requirements of the application concerned. In particular, the present invention relates to a cover device in which the cover comprises a particular fixing beads making it possible to reversibly anchor the longitudinal edges of the cover upon its deployment.

TECHNOLOGICAL BACKGROUND

Covers are applied to surfaces for reasons which depend on the nature of these surfaces. Thus, in the case of a pond such as a swimming pool, the cover can avoid pollution by leaves or animals and provide savings on energy, water and reagents, and can or must ensure safety of people, in particular of children. In a desalination pond or other fluid treatment pond, a cover makes it possible to avoid the liquid dilution due to rain or excessive evaporation due to heat.

In the case of a sports field such as a clay or grass outdoor tennis court, a cover makes it possible to protect it against bad weather, in particular intermittent rain. Moreover, a vehicle body is notably covered to ensure the stability of the load with respect to the dip in pressure caused by the movement of the vehicle and protect it against bad weather. Covers are also used as blinds for greenhouses, winter gardens or vehicle windows in order to avoid any internal overheating, and as solar protection for terrace awnings.

In all cases, the aim is generally to obtain an economical cover device that allows for easy, safe, reproducible and rapid covering and uncovering, requiring minimal human intervention and, above all, that has a life that is as long as possible. Numerous devices for covering a surface have been developed, ranging from the basic to the most sophisticated models. For example, a totally basic first device used in the case of a swimming pool comprises an inflatable or non-inflatable cover that is unwound, extended and fixed manually on the edges of the swimming pool. This type of device is illustrated for example in the documents U.S. Pat. No. 6,691,334, GB2379163 and FR2652373. Clearly, here, given the handling and the storage it relates only to swimming pools of fairly small size.

For surfaces of larger dimensions, cover devices can be used that also have a drum fixed at one of the transverse ends of the surface to be protected. The cover is deployed manually by pulling force, by unwinding from the drum, to cover the surface. The weight and the dimensions of the cover require the involvement of several people in order for it to be put in place appropriately. The cover is removed by winding it around the drum by rotation: the cover is then removed from the surface by sliding it over the latter. The rotation of the drum to remove the cover is produced manually or by means of an electric motor that has sufficient power to pull the fully deployed cover. It must be stressed that easy deployment of the cover, particularly in the case of a swimming pool, contributes to its safety, because labored handling would hamper its use. The deployment (that is to say its unwinding from the drum) and the removal (that is to say its rewinding onto the drum) of the cover can be done manually or automatically using a motor. Automatic cover devices are illustrated notably in the following documents: U.S. Pat. No. 3,574,979, GB2199741, US2005/0097834, CA2115113, US2001/0023506, U.S. Pat. No. 5,930,848, U.S. Pat. No. 4,001,900 However, this type of cover device with fixed drum described above has the major drawback of making the cover, which is dragged over the surface to be protected upon its deployment and its removal, slide, which generates premature wear thereof and greater work due to the duly generated frictions.

In the present application, the terms "longitudinal", "transverse", and their derivatives, refer respectively to the direction of movement of the drum and to the direction of the axis of revolution thereof.

In order to mitigate the drawback of the devices with fixed drum, a novel type of cover device with drum has been developed, in which the motorized drum is mounted on a longitudinal translation mechanism. The latter moves the drum over the surface to be covered which literally makes it possible to "lay" the cover on the surface, upon its deployment, by unwinding it simultaneously from the drum during its longitudinal movement, then lift it, upon its removal, by winding it simultaneously onto the drum. The cover therefore does not slip over the surface either upon its deployment or upon its removal. The cover device also comprises a system for fixing the cover at a transverse end of the surface to be covered such that the translation and the rotation of the drum result in the unwinding or the winding of the cover over the surface to be covered. Examples of automatic devices of this type are disclosed, for example, in the following documents: WO2005/026473, FR2900951, DE2257231, FR2893651, FR2789425, FR2743502, EP1719858, Moreover, a completely manual variant of the drum mounted with longitudinal translation is illustrated in the documents WO2007/036625 and U.S. Pat. No. 4,195,370.

The moving drum cover devices illustrated above provide only a fixing of a transverse edge of the cover at a transverse end of the surface to be covered, the opposite edge remaining secured to the drum. No system for fixing the longitudinal edges of the cover is provided. In particular, in the case of a swimming pool, people moving onto the cover would not be retained by its longitudinal edges and could thus be plunged into the water. Furthermore, the lack of sealing of the cover on its longitudinal edges can promote the ingress into the swimming pool of dirt, dead leaves and twigs, as well as small animals such as mice or snakes. More sophisticated devices have been proposed that make it possible to reversibly fix the longitudinal edges of the cover upon its deployment, as in the document FR2803769 which provides a system for fixing the longitudinal edges of the cover consisting of grid sections that are raised then folded back section by section on said longitudinal edges of the cover by keeping these edges inside a gutter as the latter is unwound. In this design, the longitudinal edges of the cover are gripped without being locked, which provides lesser security, particularly in the case of swimming pools.

Another advantageous system that makes it possible simultaneously to fix the longitudinal edges of the cover upon its deployment and exert a transverse pulling force thereon to tighten it perfectly has been disclosed in WO2010/010152 and in WO2010/054960. In these devices, the longitudinal edges of the cover are provided with a cord or bead which is introduced into the upwardly oriented opening of a rail in the form of a "U" section profile member, with one or two fins partially closing said opening. The bead which slips under a fin and is retained in this position by suitable fixing means, makes it possible to securely fix the longitudinal edges of the cover.

Such a cord, or bead, advantageously consists of a braid forming the core of the bead, jacketed in a fabric, generally woven or braided, the free edges of which are fixed onto at least one of the two faces of the cover along its longitudinal edges with a glue, by spot welding or, more advantageously, by stitching. An example of such a bead is represented in FIG. 2. US2003/0097709 describes a cord of this kind, in which a bead is formed by a substantially cylindrical core jacketed in a fabric strip, the free edges of which are fixed to a cover comprising a vinyl coating by hot air welding. The welding is performed using hot air guns oriented toward the interface of the free strips of the jacketing fabric and the two surfaces of the cover directly downstream of two pressure rollers applying a pressure onto the duly heated strips and covers. In FIG. 13 of US20130097709, it can be clearly seen that the weld extends exclusively to the free strips of the jacketing fabric while the core and the part of the fabric in direct contact with the core are not targeted by the air guns and are not compressed by the pressure rollers.

This solution is satisfactory, but, after a certain period of use, a puckering of the longitudinal edges of the cover is observed, which has the drawback of giving more volume to the cover wound on the drum and, above all, the major drawback of preventing the correct engagement of the bead in the opening of the rail.

The present invention proposes a form of bead extending along the longitudinal edges of the cover of a device with moving drum, which has better mechanical stability over time than the solutions hitherto proposed.

SUMMARY OF THE INVENTION

The invention is as defined in the main claim and preferred variants are defined in the dependent claims. The present invention notably comprises a device for covering a surface comprising:
  (a) A substantially rectangular cover having two longitudinal edges opposite one another and two transverse edges opposite one another, each longitudinal edge being provided with a bead extending along said edge, said bead being formed by a core of substantially prismatic geometry, preferably substantially cylindrical, contained in a tubular sheath provided over its entire length with a strip fixed to at least one face of the cover,
  (b) a rotationally mounted drum suitable for winding or unwinding the cover, said drum being mounted on a longitudinal translation mechanism comprising rails placed on either side of said surface and each consisting of a profile having an opening on one of its faces and oriented away from the surface to be covered, said face comprising at least one wing situated on the side adjacent to the surface to be covered and partially closing said cover;
  (c) a system for fixing said cover at a transverse end of the surface such that the translation and the rotation of the drum result in the unwinding/winding of the cover over the surface to be covered;
  (d) a continuous system for locking the bead of the longitudinal edges of the cover (10) in the opening of said rails enabling the bead to be engaged under the wing (6a) as the cover is unwound and to be disengaged as it is rewound,
characterized in that the core of the bead is fixed to the tubular sheath so as to prevent it from slipping along the sheath, while maintaining a flexibility of the bead that is sufficient for the operations of unwinding/winding the cover over the surface to be covered.

In a preferred embodiment of the invention, the core is formed
  (a) by a braid of synthetic or natural fibers, such as fibers of polyolefin (for example Dyneema®), polyester, polyamide, polyaramide, PVC, cotton, linen, hemp, jute, ramie, sisal, raffia, or
  (b) by a profile of elastomer material, such as natural or synthetic (polyisoprene) rubber, polybutadiene, PVC, or copolymer styrene butadiene.

The tubular sheath and the strip can be formed by a film of polymeric material, but they are preferably formed by a fabric, preferably woven, of synthetic or natural fibers, such as fibers of polyolefin, (par example Dyneema®), polyester, polyamide, polyaramide, cotton, linen, hemp, jute, ramie, sisal, raffia. In a preferred variant of the invention, the strip and the tubular sheath are woven or braided integrally with one another.

The core can be fixed to the tubular sheath according to the invention, for example by:
  (a) At least one stitching along the bead and passing right through the core,
  (b) a spot gluing along the bead, or
  (c) a spot welding along the bead, for example by ultrasound, or by localized application of a heat source.

The strip can be fixed to at least one face of the cover by:
  (a) At least one stitching along a longitudinal edge of the cover,
  (b) a spot or continuous gluing along at least one face of the cover, or
  (c) a spot or continuous welding along at least one face of the cover, for example by ultrasound, or by localized application of a heat source.

The longitudinal translation mechanism preferably comprises a carriage mounted on the rails. The engagement means of the continuous locking system preferably comprise means for applying a stress to the cover by pulling in the transverse direction upon its unwinding, said stress being maintained upon the locking of the cover in the at least one of said rails. In particular, the means for applying a transverse stress can comprise a substantially cylindrical return bearing rotationally mounted on an axis parallel to the transverse direction of the cover. This return bearing has a distal end, away from the surface to be covered, and a proximal end, adjacent to said surface. The cover partially envelopes said return bearing in order to change orientation, such that the bead extends beyond the distal end of the bearing and thus maintains the transverse tension upon the engagement of the bead in the rail. The means for applying a transverse stress can additionally comprise two tensor bearings positioned between the drum and the return bearing, the two tensor bearings being separated by a distance greater than or equal to the thickness of the cover and less than the thickness of the bead, in order to apply a transverse tension to the cover and guide the bead beyond the distal end of the return bearing.

In a preferred variant of the invention, the carriage transversely overhanging the surface to be covered and supporting the drum comprises, at each of its ends:
  (a) a driving wheel of which the axis of rotation is parallel, preferably coaxial, to that of said drum;
  (b) at least two casters resting on the rails and allowing the longitudinal translation of the carriage, and being mounted on either side of the driving wheel, and forming with the latter a triangle of which the driving wheel forms the top vertex (that is to say, away from the plane of the surface to be covered); and the translation mechanism comprises two flexible belts fixed only at each of their ends to the four corners of the surface to be covered, each of the two belts:

(c) being arranged in the opening of the rails in the lateral sections contained between a fixing point and the caster closest to said fixing point, and (d) capping, without slip, the driving wheel in the central section contained between the two casters.

Such a mechanism makes it possible:

(a) upon the unwinding of the cover (=deployment of the cover), to insert the bead of each longitudinal edge of the cover into the opening of the corresponding rail as the carriage advances and block it therein by the insertion, immediately after, into the same opening, of the lateral section of the belt directly adjacent to the caster downstream of the direction of translation of the carriage, and (b) upon the rewinding of the cover (=removal of the cover), to remove from said opening of the rail, the central section of the belt directly adjacent to the caster upstream of the direction of translation of the carriage, thus allowing the bead to be disengaged from the rail and making it possible to rewind the cover onto the drum of the carriage.

The cover device preferably comprises means for modifying the relative speed of rotation between the cover winding/unwinding drum and the axis of rotation of the driving wheels. In particular, such means can include a spiral-wound spring placed inside the drum and that makes it possible to neutralize the difference between the speed of rotation of the driving wheels, which must remain substantially constant, and the speed of rotation of the drum, which varies with the outer diameter of the drum as the cover is wound/unwound. If the spiral-wound spring is stretched upon the unwinding of the cover, this has the advantage that, upon the rewinding of the cover, there is no need to motorize the rotation of the drum to gather up the cover.

The device of the present invention is particularly suitable for covering surfaces such as:

(a) a pond, filled or not with a liquid, such as a swimming pool, a water retaining, treatment or desalination pond;
(b) a sports field, such as a tennis court or a cricket field;
(c) a vehicle body,
(d) a glazed surface such as a greenhouse, a winter garden or a vehicle window.

BRIEF DESCRIPTION OF THE FIGURES

These aspects and other aspects of the invention will be clarified in the detailed description of particular embodiments of the invention, reference being made to the drawings of the figures, in which.

DETAILED DESCRIPTION OF PARTICULAR EMBODIMENTS

Figure 1:
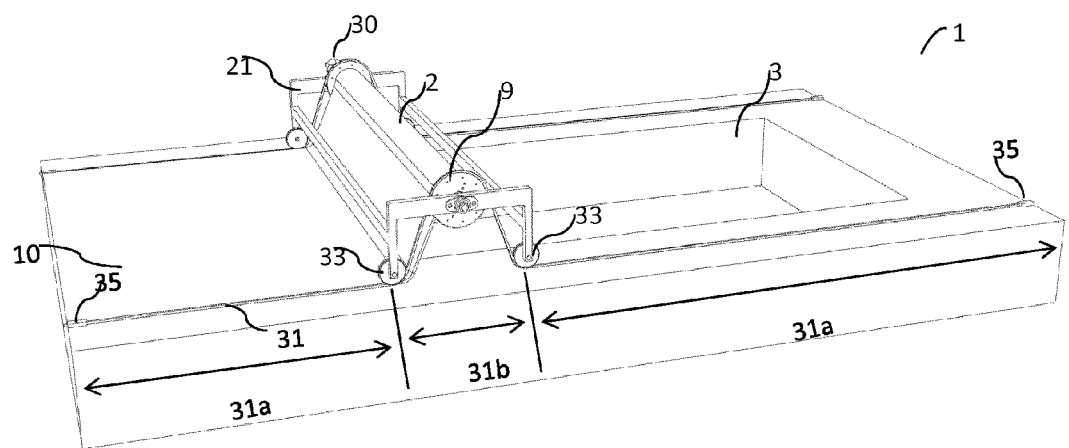
FIG. 1 is a perspective overview of a surface with the drum in position such that a part of the surface only is covered by a cover.

As represented in FIG. 1, the automatic device for covering (1) a surface (3) according to the invention comprises a cover (10) intended to protect said surface (3). The device (1) makes it possible to cover notably surfaces defined by the outline of a water pond such as a swimming pool, water treatment pond, waste water purification station, retention pond, desalination station, etc. However, the invention will be able to be implemented in any field requiring a surface to be covered, such as, for example, a clay or grass tennis court, a vehicle body, a glazed greenhouse surface, window of a vehicle such as a train or bus, or of a winter garden, etc. Generally, in the present application, "surface" should therefore be understood to mean any area delimited by a perimeter.

The device (1) comprises a drum (2) which has a length at least equal to the width of the cover (10), the latter having to be of sufficient width and length to cover all the surface to be protected (3) when it is deployed. The drum (2) is mounted on a longitudinal translation mechanism comprising rails (6) placed on either side of said surface (3). The drum (2) has two directions of rotation: the first direction of rotation enabling it to unwind the cover (10) to deploy it and cover the surface to be protected (3), and the second direction of rotation allowing it to wind the cover (10) in order to remove it and give access to said surface (3).

The device (1) further comprises a fixing system situated at a transverse end of the surface to be covered and allowing the cover to be unwound/wound over the surface to be covered (3) upon the translation and the rotation of the drum (2). Any known type of fixing system suited to the stress and safety criteria according to the application can be used for this purpose. For example, the fixing system can comprise a plurality of straps secured to the visible transverse end of the cover (10), said straps being, for example, provided with anchoring hooks which are fastened onto the transverse part of the outline delimiting the surface to be covered (3). Alternatively, the end of the cover to be fixed can be provided with eyelets which come to be fixed to the transverse edge of the surface via a series of studs, screws, a cable or any other means. These anchoring means keep the visible transverse end of the cover (10) immobilized which makes it possible to generate on said cover a longitudinal pulling force and unwind it without having to motorize the rotation of the drum (2) when it is moved to cover the surface (3).

The cover can be made of any material suited to the application concerned: synthetic or natural fabric materials, polymeric films, battens of polymer, metal or wood, etc. It can be transparent, opaque or translucent and can form a barrier to fluids or, on the contrary, be porous, and even include mesh as in a net. For example, for swimming pool or water treatment pond or similar applications, it is advantageous if the cover comprises drainage holes thus making it possible for rainwater not to build up on the cover and thus avoiding the formation of water pockets on the surface of the cover.

Figure 2:
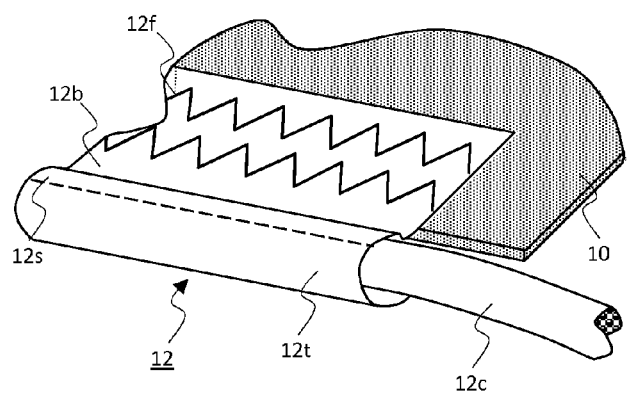
FIG. 2 is a view of a bead according to the invention.

As illustrated in FIG. 2, the bead placed along the two longitudinal edges of the cover is formed by a core (12c) of substantially prismatic geometry, preferably substantially cylindrical. The core (12c) is jacketed in a tubular sheath (12t) provided over its entire length with a strip (12b) fixed to at least one face of the cover.

A longitudinal tension can be applied to the cover upon its deployment simply by ensuring that the speed of unwinding of the cover by the rotation of the drum is less than the speed of longitudinal translation of the drum, or via a brake or a spring in the drum rotation system, or by a differentiated motorized control of the rotational and translational movements of the drum. If these two speeds are synchronous, the cover will be deployed without tensions other than those generated by its own weight in the case of the cover of a surface comprising a cavity such as a swimming pool.

The device (1) that is the subject of the invention comprises a continuous system for locking the longitudinal edges of the cover (10) in the rails (6) that is engaged as it is unwound and is disengaged when it is wound. Such locking systems are described, for example, in WO2010/010152 and WO2010054960, the content of which is included in the present application by reference. A locking system to which the present invention applies comprises:

(a) two rails (6) extending along the longitudinal sides and on either side of the surface to be covered. The rails consist of a profile member having an opening (14) toward the outside (i.e. oriented away from the surface to be covered) on one of its faces and comprising one or two partially closing wings on either side of said opening (14) (if there is only one wing (6a) it is situated on the side adjacent to the surface to be covered);

(b) the longitudinal edges of the cover (10) each comprise at least one bead (12) formed by a core (12c) of substantially prismatic geometry, preferably substantially cylindrical, contained in a tubular sheath (12t) provided over its entire length with a strip (12b) fixed to at least one face of the cover (see FIG. 2);

(c) engaging means (13, 15a, 15b) making it possible to engage said bead (12) in the opening (14) formed by the wing(s) (6a) of the rail (6) and to slip it under one of the wings and fixing means (31) to prevent the bead from being able to leave said opening (14), such that the cover (10) is locked to the rail (6).

Such a locking system makes it possible to slip the bead (12) into the opening (14) of the rail (6) and to clamp it therein, thus resulting in the continuous fixing in said rail (6) of the corresponding longitudinal edge of the cover (10) and thereby keeping the cover (10) over the surface to be covered (3) even in the case of very strong mechanical stresses due for example to a depression or gravity. In the case of swimming pools, it provides a safety factor in the case of access (authorized or not) onto the cover. The strength of the locking system can easily reach a range of 5 to 10 kNm (500 to 1000 kgm) which is sufficient for many applications. Depending on the materials used, higher locking strengths can be achieved.

Figure 5:
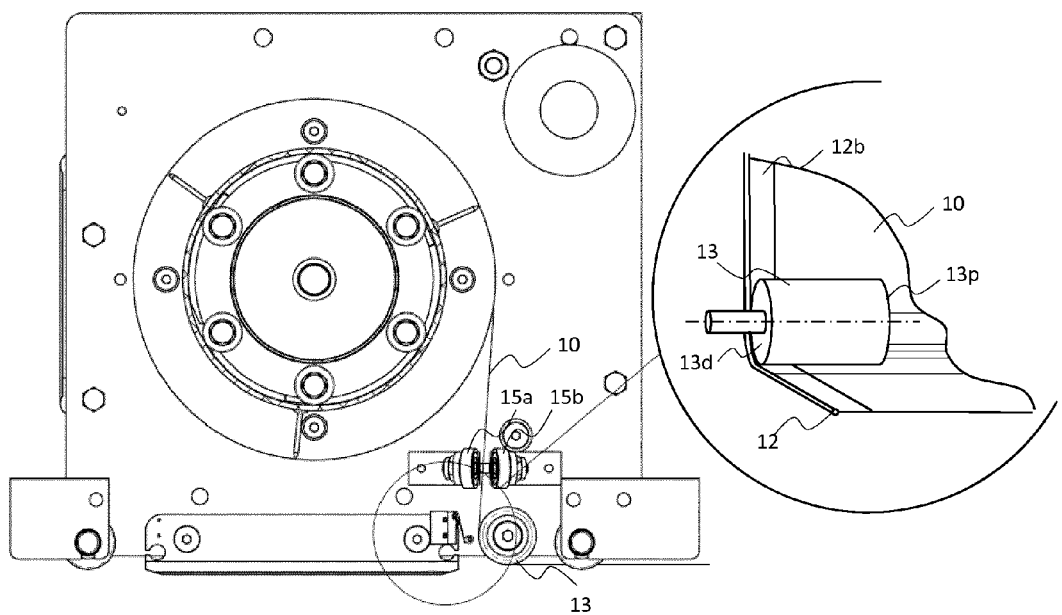
FIG. 5 shows a detail of a means for applying a transverse stress to the cover, comprising two tensor bearings and one return bearing.

In a preferred embodiment, the locking system of the cover device (1) comprises means for applying a transverse tension to the cover, which also guide the bead toward the opening of the corresponding rail. As represented in FIG. 5, such means preferably comprise two tensor bearings (15a, 15b) separated from one another by a distance greater than the thickness of the cover and less than the thickness of the bead (12), in order to apply a transverse tension to the cover. The means also preferably comprise at least one substantially cylindrical return bearing (13) mounted to rotate about an axis parallel to the transverse direction of the cover, said return bearing having a distal end (13d), away from the surface to be covered, and a proximal end (13p), adjacent to said surface, the cover partially enveloping said bearing (13) in order to change orientation, such that the bead (12) extends beyond the distal end (13d) of the bearing. If the system comprises two tensor bearings (15a, 15b), the latter are placed between the return bearing (13) and the drum, in order to position the bead of the cover when it reaches the return bearing (13) beyond its distal edge (13d).

Generally, it is preferable for the longitudinal translation mechanism to comprise a carriage (21) mounted on the rails (6) and supporting the drum. In a particularly preferred variant of the present invention, the translation and locking system are as described in WO2010054960 and represented in FIG. 1, and comprises a carriage (21) mounted on the rails (6) and transversely overhanging the surface (3) to be covered and supporting the drum (2). Said carriage comprises, at each of its ends:

(a) a driving wheel (9) of which the axis of rotation is parallel to that of said drum (2); the two driving wheels (9) are preferably motorized;

(b) at least two casters (33) resting on the rails (6) and allowing the longitudinal translation of the carriage (21), and being mounted on either side of the driving wheel (9), and forming with the latter a triangle of which the driving wheel (9) forms the top vertex; and the translation and fixing mechanism comprises two flexible belts (31) fixed only at each of their ends (35) to the four corners of the surface to be covered, each of the two belts (31):

(c) being arranged in the opening (14) of the rails (6) in the lateral sections (31a) contained between a fixing point (35) and the caster (33) closest to said fixing point, and (d) capping, without slip, the driving wheel (9) in the central section (31b) contained between the two casters (33).

Such a system is very advantageous because it fulfils multiple functions. It first of all makes it possible to move the carriage along the rails. Since the angular segment of the driving wheel (9) capped by a flexible belt (31) as described above is much greater than that covered by a straight rack, for example placed on the bottom of the rail, the risks of a driving wheel slipping are considerably reduced. Such slipping of a driving wheel would cause the carriage to skew and jam the system. A second advantage of such a system is that, between the carriage and the corners (35) of the surface to be covered, the opening (14) is blocked by the belt (31) which is inserted into the rail in its portions (31a). This makes it possible to reduce the ingress of foreign bodies into the rails, such as dust, gravel, twigs, etc., and also prevent a person from jamming a toe therein, for example in the case of a swimming pool. Finally, and this relates more particularly to the present invention, the belts make it possible to fix the bead (12) under the wing (6a) of a rail as the bead is introduced under the wing (6A) of the rail.

Figure 4:
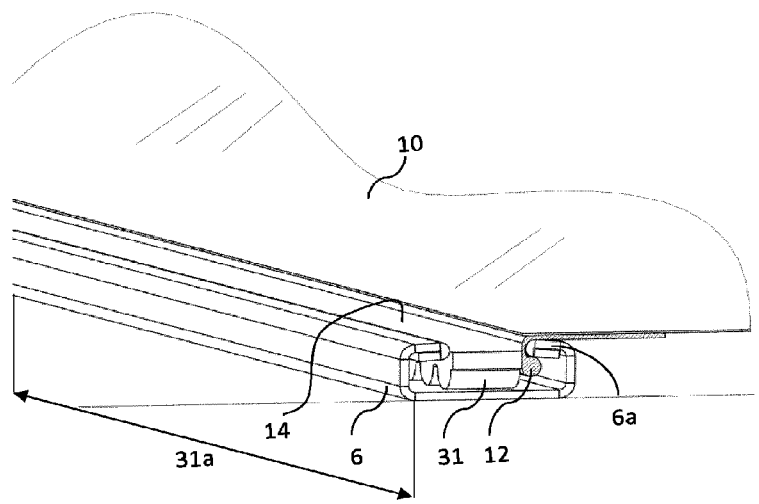
FIG. 4 illustrates a mechanism for fixing a bead in the opening of a rail via a flexible belt.

FIG. 4 illustrates the system for fixing the bead under the wing (6a) of a rail. As discussed above, the bead (12) is guided into the opening (14) of the corresponding rail by tensor (15a, 15b) and return (13) bearings. Once in the opening (14), the bead would exit therefrom upon the first stress if it were not fixed. The introduction of the belt (31) into the opening of the rail directly after the introduction of the bead (12) makes it possible to fix the latter under the wing (6a), thus preventing it from exiting therefrom. When the cover is removed from the surface, the belt is removed first, which frees the bead which can exit. To sum up, the fixing system operates as follows:

(a) upon the unwinding of the cover (=deployment of the cover), the bead (12) of each longitudinal edge of the cover is inserted into the opening (14) of the corresponding rail (6) as the carriage advances and is blocked therein by the insertion, immediately after, into the same opening of the lateral section (31a) of the belt directly adjacent to the caster (33) downstream of the direction of translation of the carriage, and (b) upon the rewinding of the cover (=removal of the cover), the central section (31b) of the belt directly adjacent to the caster (33) upstream of the direction of translation of the carriage is removed from said opening (14) of the rail, thus allowing the bead (12) to be disengaged from the rail and making it possible to rewind the cover onto the drum (2) of the carriage.

In a cover system as described above, the beads of the longitudinal edges of the cover are subject to numerous torsional mechanical stresses when the bead passes through the different bearings, which provokes significant shear forces between the core (12c) and the tubular sheath (12t) forming the bead (12). These shear forces provoke a puckering of the tubular sheath (12t) which can, over time, become significant, as is encountered in the hood or the bottom of an anorak, when the strings which are contained in a tubular fold of the anorak are pulled. Such puckerings on a cover have multiple drawbacks. First of all, the esthetic appearance of the cover is greatly degraded thereby, because wrinkles appear on the edges of the cover, extending toward the center thereof. Then, the puckerings of the tubular sheath (12t) increases the diameter of the edges of the cover which is wound on the drum (2). Finally, the puckerings make it more difficult, even in extreme cases, impossible, to insert the bead (12) into the opening (14) of the rails (6). For all these reasons, it is essential to avoid the formation of puckerings of the tubular sheath (12t).

It has been found that it was possible to avoid the formation of puckerings of the tubular sheath (12t), by fixing the core (12c) of the bead to the tubular sheath (12t) so as to prevent it from slipping along the sheath in response to the numerous stresses to which a bead is subject upon successive deployments and removals of the cover. It is essential, obviously, for the fixing of the core to the tubular sheath to maintain a flexibility of the bead that is sufficient for the operations of unwinding/winding of the cover (10) over the surface to be covered (3).

Generally, the core (12c) is formed
(a) by a braid of synthetic or natural fibers, such as fibers of polyolefin, polyester, polyamide, polyaramide, cotton, linen, hemp, jute, ramie, sisal, raffia, or
(b) by a profile of elastomer material, such as natural or synthetic (polyisoprene) rubber, polybutadiene, PVC, or copolymer styrene butadiene.

For their part, the tubular sheath (12t) and strip (12b) are generally formed by a film of polymeric material or by a fabric, preferably woven or braided, of synthetic or natural fibers, such as fibers of polyolefin, polyester, polyamide, polyaramide, PVC, cotton, linen, hemp, jute, ramie, sisal, raffia. It is preferable for the strip (12b) and the tubular sheath (12t) to be woven or braided integrally with one another.

The core (12c) can be fixed to the tubular sheath (12t) while maintaining a sufficient flexibility of the duly formed bead (12) by:
(a) At least one stitching (12s) along the bead and passing right through the core as represented in FIG. 3(c),
(b) a spot gluing (12g) along the bead, as represented in FIG. 3(d), or
(c) a spot welding (12w) along the bead, for example by ultrasound, or by localized application of a heat source as represented in FIG. 3(e).

Figure 3:
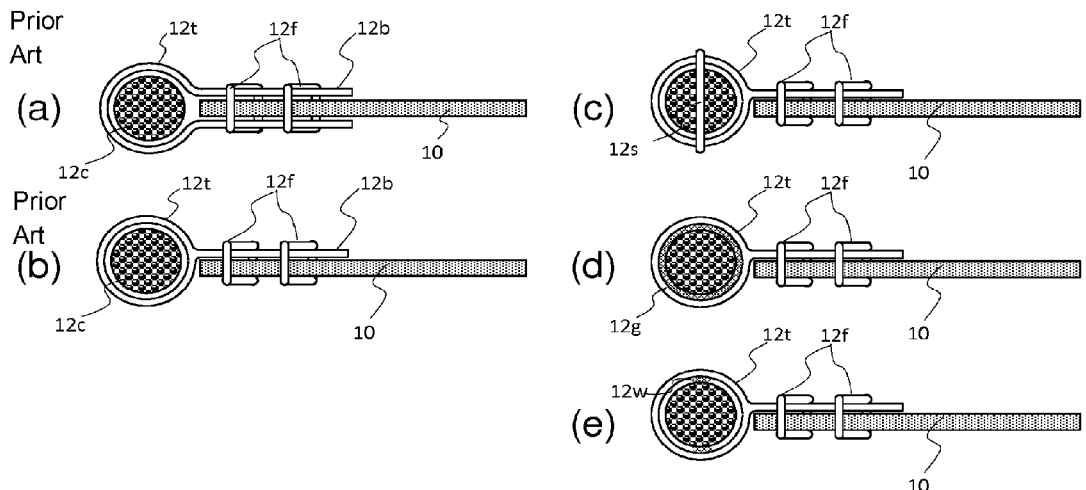
FIG. 3 shows two beads in cross section: (a), (b) according to the prior art and (c)-(e) according to the invention.

Preferably, the core is fixed to the sheath by a stitching (12s) along the bead (see FIG. 3(c)).

Similarly, the strip (12b) can be fixed to at least one face of the cover (10) by:
(a) At least one stitching (12f) along a longitudinal edge of the cover,
(b) a spot or continuous gluing along at least one face of the cover, or
(c) a spot or continuous welding along at least one face of the cover, for example by ultrasound, or by localized application of a heat source.

As illustrated in FIGS. 3(a)&(b), the strip can fixed to only one face of the cover (see FIG. 3(b)) or to both faces thereof, sandwiched between two flaps of the strip (12b) (see FIG. 3(a)). In a preferred variant of the present invention, the tubular sheath (12t) and the strip (12b) are woven or braided integrally with one another and the strip is fixed only to one face of the cover (10) as represented in FIGS. 2(c)-(e).

The movement of the drum along a surface to be covered or uncovered generally takes place at a constant speed. The driving wheels (9) must therefore rotate at a substantially constant rotation speed. However, above all for surfaces of significant longitudinal dimensions, the outer diameters of the drum when the cover is deployed or removed can vary considerably. Since the speed of deployment/removal of the cover depends on the speed of rotation of the driving wheels (which remains generally constant) and since the outer diameter of the drum varies with the cover portion which is wound thereon, it follows therefrom that the drum and the driving wheels (9) cannot rotate at the same speed. For covers of small dimensions, it is possible to neutralize the speed differences by a pulling force on the cover. For covers of greater longitudinal dimensions, such as for a swimming pool or a trailer of a semi-trailer, it is necessary to provide means for modifying the relative speed of rotation between the cover winding/unwinding drum and the axis of rotation of the driving wheels (9). These means can include a spiral-wound spring placed inside the drum (2) making it possible to neutralize the difference between the speed of rotation of the driving wheels, which must remain substantially constant, and the speed of rotation of the drum, which varies with the outer diameter of the drum as the cover is wound/unwound. Upon the deployment of the cover, the drum rotates spontaneously due to the tension created by the cover which is fixed to a lateral edge of the surface to be covered. If the spiral spring is stretched during the deployment of the cover (10) on the surface, there is no need to motorize the rotation of the drum either upon the gathering up and rewinding of the cover around the drum, the rotation of which is driven by the releasing of the spiral spring. This system is highly advantageous because it does not require a second motor or a gear or electronic control system to rotate the drum at the appropriate speed.

A cover system according to the present invention is particularly suitable for covering surfaces such as:
(a) a pond, filled or not with a liquid, such as a swimming pool, a water retaining, treatment or desalination pond;
(b) a sports field, such as a tennis court or a cricket field;
(c) a vehicle body, such as a trailer,
(d) a glazed surface such as a greenhouse, a winter garden or a vehicle window.

With a bead (12) according to the present invention, no more formation of puckerings of the tubular sheath has been observed following series of winding/unwinding tests repeated 10,000 times on a surface having longitudinal edges 15 m long, corresponding to the dimension of a swimming pool. With the earlier beads, in which the core (12c) is not fixed in the tubular sheath (12t), puckerings thereof appeared after only a few tens of cycles.

The invention claimed is:
1. A device for covering a surface comprising:
(a) a substantially rectangular cover having two longitudinal edges opposite one another and two transverse edges opposite one another, each longitudinal edge being provided with a bead extending along said edge, said bead being formed by a core of substantially prismatic geometry contained in a tubular sheath provided over its entire length with a strip fixed to at least one face of the cover,
(b) a rotationally mounted drum adapted for winding or unwinding the cover, said drum being mounted on a longitudinal translation mechanism comprising rails placed on either side of said surface and each consisting of a profile having an opening on one of its faces and oriented away from the surface to be covered, said face comprising at least one wing situated on the side adjacent to the surface to be covered and partially closing said opening;
- (c) a system for fixing said cover at a transverse end of the surface such that the translation and the rotation of the drum result in the unwinding/winding of the cover over the surface to be covered; and
- (d) a continuous system for locking the bead of the longitudinal edges of the cover in the opening of said rails enabling the bead to be engaged under the wing as the cover is unwound and to be disengaged as it is rewound wherein the core of the bead is fixed to the tubular sheath so as to prevent it from slipping along the sheath, while maintaining a flexibility of the bead that is sufficient for the operations of unwinding/winding the cover over the surface to be covered.

2. The device according to claim 1, in which the core is formed
- by a braid of synthetic or natural fibers, or
- by a profile of flexible material comprising a natural or synthetic rubber, polybutadiene, PVC, or copolymer styrene butadiene.

3. The device according to claim 1, in which the tubular sheath and the strip are formed by a film of polymeric material or by a woven or braided fabric of synthetic or natural fibers and in which the strip and the tubular sheath are woven or braided integrally with one another.

4. The device according to claim 1, in which the core is fixed to the tubular sheath by
- at least one stitching along the bead and passing right through the core,
- a spot gluing along the bead, or
- a spot welding along the bead.

5. The device according to claim 1, in which the strip is fixed to at least one face of the cover by
- at least one stitching along a longitudinal edge of the cover,
- spot or continuous gluing along at least one face of the cover, or
- a spot or continuous welding along at least one face of the cover.

6. The device according to claim 1, in which said longitudinal translation mechanism comprises a carriage mounted on the rails.

7. The device according to claim 1, in which said engagement means of the continuous locking system comprise means for applying a stress to the cover by pulling in the transverse direction upon its unwinding, said stress being maintained upon the locking of the cover in the at least one of said rails.

8. The device according to claim 7, in which the means for applying a transverse stress comprise a substantially cylindrical return bearing rotationally mounted on an axis parallel to the transverse direction of the cover, said return bearing having a distal end, away from the surface to be covered, and a proximal end, adjacent to said surface, the cover partially enveloping said bearing in order to change orientation, such that the bead extends beyond the distal end of the bearing.

9. The device according to claim 8, in which the means for applying a transverse stress further comprise two tensor bearings positioned between the drum and the return bearing, the two tensor bearings being separated by a distance greater than or equal to the thickness of the cover and less than the thickness of the bead, in order to apply a transverse tension to the cover and guide the bead beyond the distal end of the return bearing.

10. The device according to claim 7, in which said carriage transversely overhanging the surface to be covered and supporting the drum comprises, at each of its ends:
- (i) a driving wheel of which the axis of rotation is parallel to that of said drum;
- (ii) at least two casters resting on the rails and allowing the longitudinal translation of the carriage, and being mounted on either side of the driving wheel, and forming with the latter a triangle of which the driving wheel forms the top vertex; and in which the translation mechanism comprises two flexible belts fixed only at each of their ends to the four corners of the surface to be covered, each of the two belts:
- (iii) being arranged in the opening of the rails in the lateral sections contained between a fixing point and the caster closest to said fixing point, and
- (iv) capping, without slip, the driving wheel in the central section contained between the two casters.

11. The device according to claim 10, in which:
- (v) upon the unwinding of the cover, the bead of each longitudinal edge of the cover is inserted into the opening of the corresponding rail as the carriage advances and is blocked therein by the insertion, immediately after, into the same opening of the lateral section of the belt directly adjacent to the caster downstream of the direction of translation of the carriage, and
- (vi) upon the rewinding of the cover, the central section of the belt directly adjacent to the caster upstream of the direction of translation of the carriage is removed from said opening of the rail, thus allowing the bead to be disengaged from the rail and making it possible to rewind the cover onto the drum of the carriage.

12. The device according to claim 10, comprising means for modifying the relative speed of rotation between the cover winding/unwinding drum and the axis of rotation of the driving wheels, said means including a spiral-wound spring placed inside the drum and that makes it possible to neutralize the difference between the speed of rotation of the driving wheels, which must remain substantially constant, and the speed of rotation of the drum, which varies with the outer diameter of the drum as the cover is wound/unwound.

13. The device according to claim 1, in which the surface to be covered is selected from the group consisting of
- a pond, filled or not with a liquid, such as a swimming pool, a water retaining, treatment or desalination pond
- a sports field, such as a tennis court or a cricket field
- a vehicle body, and
- a glazed surface such as a greenhouse, a winter garden or a vehicle window.

\* \* \* \* \*